H. R. HUGHES.
ROLLER BORING DRILL.
APPLICATION FILED APR. 10, 1913.

1,306,694.

Patented June 17, 1919.
2 SHEETS—SHEET 1.

H. R. HUGHES.
ROLLER BORING DRILL.
APPLICATION FILED APR. 10, 1913.
1,306,694.
Patented June 17, 1919.
2 SHEETS—SHEET 2.
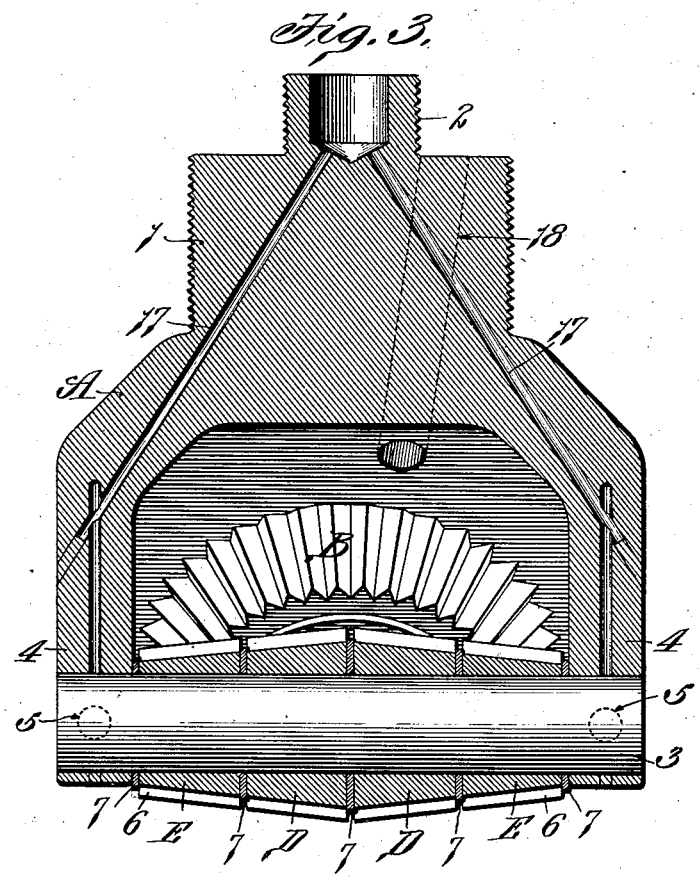
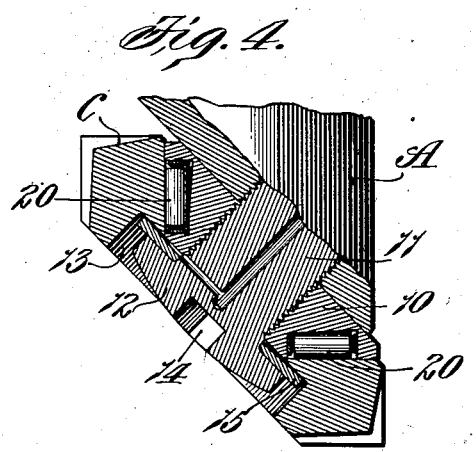
Witnesses:
Geo. F. Radson
M. Badger
Inventor,
Howard R. Hughes.
By Bakewell & Cornwell attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROLLER-BORING DRILL.

1,306,694.  Specification of Letters Patent.  Patented June 17, 1919.

Application filed April 10, 1913. Serial No. 760,167.

*To all whom it may concern:*

Be it known that I, HOWARD R. HUGHES, a citizen of the United States, residing at Houston, Texas, have invented a certain new and useful Improvement in Roller-Boring Drills, of which the following is a full, clear, and exact description, such as will enable others skilled in the art to which it appertains to make and use the same.

This invention relates to roller boring drills.

One object of the invention is to provide a strong and efficient roller boring drill that can be manufactured at a low cost.

Another object is to provide a roller boring drill of novel design that will under-ream a hole.

And still another object is to provide an under-reaming drill having cutting rollers which are so arranged that the drill will seat itself in a tapered recess at the bottom of the hole being formed, thereby insuring a circular hole of approximately uniform diameter. Other objects and desirable features of my invention will be hereinafter pointed out.

Figure 1 of the drawings is a side elevational view partly in vertical section of a roller boring drill constructed in accordance with my invention;

Fig. 3 is a vertical sectional view taken at right angles to Fig. 1; and

Fig. 4 is a detail sectional view illustrating a slight modification of my invention.

Figure 2:
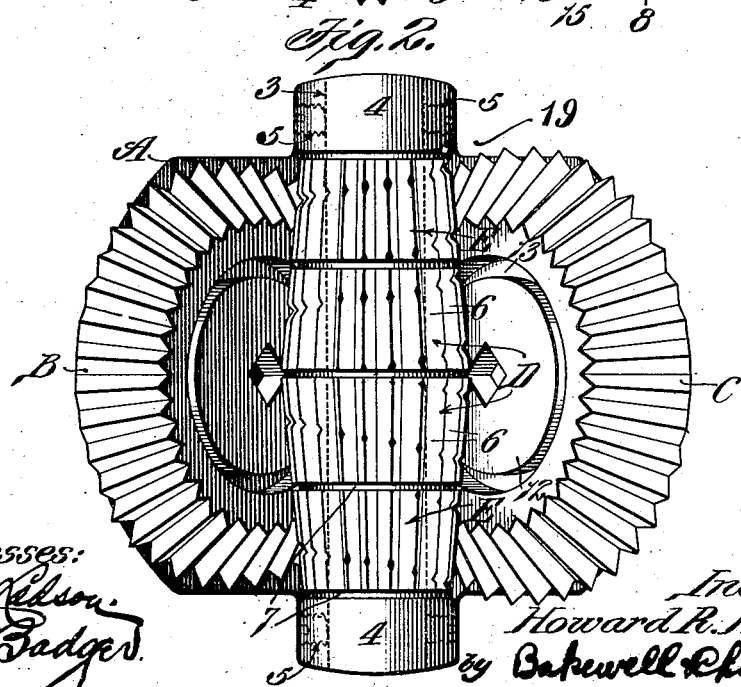
Fig. 2 is a bottom plan view of said drill.

Referring to the drawings which illustrate the preferred form of my present invention, A designates the head of the drill which is preferably formed in one piece and provided at its upper end with a screw-threaded boss 1 to which the hollow drill stem, not shown, is connected. A ring-shaped flange 2 is also provided at the upper end of the head so as to support a lubricant holder, not shown. Two cutting rollers B and C are arranged diametrically opposite each other in a pocket in the head on spindles that project downwardly and inwardly toward the longitudinal axis of the head, and a rotatable cutting means is arranged horizontally between the rollers B and C so as to disintegrate the material at the center of the hole being formed. In the preferred form of my invention as herein shown the horizontally arranged cutting means just referred to consists of a plurality of slightly tapered rollers that are rotatably mounted on a hoizontally disposed shaft 3 which is secured to bearings 4 on the head of the drill by means of set screws 5 or in any other suitable manner. One pair of rollers D, which are of the same dimensions, are arranged on the shaft 3 with their large ends butting against each other, as shown in Fig. 2, and a pair of rollers E are arranged outside of the center rollers D with their large ends butting against the small ends of said rollers D. All of said rollers D and E are provided with chisel-teeth 6 which extend parallel to the shaft 3 on which said rollers turn, and washers 7 are preferably interposed between said rollers and also between the end rollers and the shaft bearings on the drill head. It is immaterial, however, so far as my broad idea is concerned what particular kind of cutting surface the rollers D and E are provided with. By arranging the rollers D and E in the manner above-described I obtain a substantially cylindrical-shaped cutting device that tapers slightly in opposite directions from its middle to its ends and which will form a tapered cone-shaped recess at the center of the hole when the drill is in operation. The side rollers B and C distintegrate the material at the bottom of the hole that lies outside of the path of the center rollers D and E, and said side rollers also shear off the material from the vertical side wall of the hole. In the preferred form of my invention, as herein shown, each of the rollers B and C is provided with two sets of radially-disposed chisel-teeth 8 and 9 which are disposed at approximately right angles to each other when the drill is in service. The teeth 8 of each roller extend at approximately an acute angle to the inner end face of the roller, and in view of the fact that the roller is mounted on a spindle which projects downwardly and inwardly toward the longitudinal center of the drill-head, said teeth 8 are disposed at approximately right angles to the longitudinal axis of the drill. The portions of the rollers B and C on which the teeth 8 are formed are substantially frusto-conical shape and they are so arranged that their vertices terminate at the longitudinal center of the drill-head. Consequently, the teeth 8 have a true rolling action on the bottom of the hole and they therefore cut and disintegrate the material without slipping or dragging over the material.

The frusto-conical-shaped portion of the roller C on which the chisel-teeth 8 are formed is slightly larger than the corresponding portion of the roller B so that the teeth 8 of the roller C are longer than the teeth 8 of the roller B. In other words, the roller C will cut an annular path through the material of greater diameter than the path cut by the roller B and consequently the drill will under-ream a hole or form a hole of greater diameter than the combined cutting area of the drill. Consequently, the drill will never lose its clearance owing to the fact that the area of the cutting surface on one side of the longitudinal axis of the drill is greater than the area of the cutting surface on the other side of the longitudinal axis of the drill. In view of the fact that the rollers D and E form a tapered or inverted cone-shaped recess in the bottom of the hole the drill will seat itself at the center of the hole and will not wabble back and forth when it is in service. This is a very desirable and important feature of my drill for it insures a circular hole of approximately uniform diameter. If no means were provided for holding the drill at the center of the hole the drill would wabble back and forth and merely form a hole of the same diameter as the distance between the outer edges of the rollers B and C. A tapered or inverted cone-shaped recess is the best means for holding a drill at the center of the hole and as my improved drill is provided with rollers that form such a recess the drill will under-ream a hole or form a hole of greater diameter than the distance across the cutting face of the drill, the rollers D and E remaining seated in the tapered recess at the bottom of the hole and thus holding the roller C in such a position that it cuts an annular path of greater diameter than the path cut by the roller B.

Figure 1:
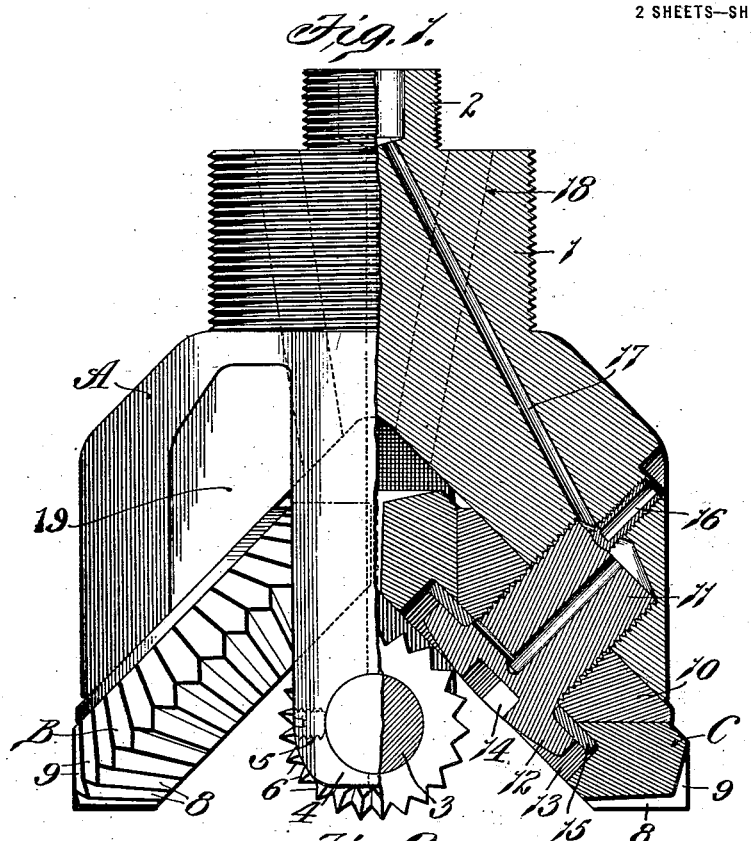

The rollers B and C can be retained on the head A in various ways without departing from the spirit of my invention but I prefer the construction herein shown on account of the fact that it is strong and serviceable and provides a relatively large bearing surface for each of the rollers B and C. As shown in Fig. 1, the spindles for the rollers B and C each consists of a cone-shaped bearing member 10 that fits in a correspondingly-shaped seat or recess formed in the roller and a fastening device 11 that prevents the roller from moving longitudinally off of said bearing member 10, said fastening device having a screw-threaded shank that is screwed into the member 10 and into the head A of the drill. At the outer end of the shank of said fastening device is a head 12 which laps over the outer end face of the roller, a circular recess 13 being preferably formed in the outer end face of the roller to receive the head 12 of said fastening device. A slot or non-circular-shaped socket 14 is formed in the head 12 of the fastening device 10 so as to receive the tool that is used to screw said device into the head of the drill, and if desired, a washer 15 can be arranged under the head of said fastening device so as to prevent said head from wearing away, the washer 15 and cone-shaped member 10 constituting removable bearing members that can be renewed easily when they become worn. The fastening device 11 holds the roller securely in position, and, if desired, a hollow set screw 16 or other suitable device can be mounted in the head A of the drill so as to lock said fastening device in position.

Lubricating ducts 17 are formed in the head A so as to supply a lubricating medium to the bearings of the rollers B, C, D and E, and water passageways 18 are also formed in the head, as shown in broken lines in Fig. 1, and in full lines in Fig. 3, so as to discharge streams of water onto the material which the rollers disintegrate and thus flush out the hole, the head A of the drill being provided at its sides with four notches or cut-out portions 19 up through which the water and disintegrated material escape. If desired, the removable bearing member 10 can be provided with roller bearings 20 or other suitable friction-reducing devices, as shown in Fig. 4.

A drill of the construction above-described is strong and rigid owing to the fact that the head is formed in one piece and the rollers are mounted on the head in such a manner that they are capable of successfully withstanding great strains. Comparatively small rollers may be used for the outer cutting members of the drill, and as the center cutting members also consist of small rollers, the drill can be manufactured at a low cost. It is practically impossible for the drill to lose its clearance owing to the fact that it comprises rollers which shear off the material at the side of the hole, and in view of the fact that center rollers form a tapered recess on the bottom of the hole, the drill will remain centered and thus insure the roller C cutting an annular path of greater diameter than the combined cutting area across the face of the drill, thereby enabling the drill to be used for under-reaming a hole of approximately the same diameter as the head of the drill.

Having thus described my invention, what I claim as new and desire to secure by Letters Patent is:

1. A boring drill comprising a head, means on said head for forming a tapered recess at the bottom of the hole so as to center the drill, said means comprising a diametrical cross roller with cutters thereon of largest diameter at the center of said head, and rollers on said head which describe an annular path around said recess, one of said rollers having a cutting surface that projects laterally beyond the drill-head.

2. A boring drill comprising a head, means on said head for forming a tapered recess at the bottom of the hole so as to center the drill, said means comprising a diametrical cross roller with cutters thereon of largest diameter at the center of said head, and rollers on said head which describe an annular path around said recess, the outer edge portion of the cutting surface of one of said rollers being located a greater distance from the longitudinal center of the drill than the outer edge portion of the cutting surface of the other roller.

3. A boring drill comprising in combination a head, a roller on said head having an approximately frusto-conical-shaped cutting portion which is so arranged that it will cut an annular path through the material of greater diameter than the head of the drill, and horizontally arranged cutting disks to cut the material inside said annular path and for forming a tapered recess at the bottom of the hole being formed so as to center the drill.

4. A boring drill comprising a head, a horizontally disposed shaft on said head, a rotatable barrel-shaped cutting means on said shaft of greatest diameter at the center of the head and diminishing gradually in diameter toward its ends, and inclined rollers arranged on opposite sides of said shaft and having approximately frusto-conical-shaped cutting portions.

5. A boring drill comprising a head, a horizontally disposed shaft on said head, a rotatable barrel-shaped cutting means on said shaft of greatest diameter at the center of the head and diminishing gradually in diameter toward its ends, and rollers arranged on opposite sides of said shaft and having approximately frusto-conical-shaped cutting portions, the frusto-conical-shaped cutting portion of one of said rollers being of greater diameter than the corresponding portion of the other roller.

6. A boring drill comprising a head, oppositely disposed spindles on said head that project downwardly and inwardly toward the longitudinal axis of the head, rollers on said spindles having approximately frusto-conical-shaped cutting portions, and horizontally disposed rollers arranged between the rollers on said inclined spindles, said horizontally disposed rollers being frusto-conical-shaped to form a tapered recess at the bottom of the hole being formed.

7. A boring drill comprising a head, two disk-shaped cutting rollers on said head having cutting surfaces that act on the side of the hole and cutting surfaces that act on the bottom of the hole, and a separate horizontally disposed rotatable cutting means on said head that acts on the center portion of the bottom of the hole.

8. A boring drill comprising a head provided with spindles that incline downwardly and inwardly toward the longitudinal center of said head, rollers on said spindles having cutting surfaces that are disposed at approximately right angles to each other, and a plurality of horizontally disposed rollers that lie between the rollers on said spindles, said last named rollers being of greatest diameter at the center of said head.

9. A boring drill comprising a head provided with spindles that incline downwardly and inwardly toward the longitudinal center of said head, rollers on said spindles having cutting surfaces that are disposed at approximately right angles to each other, and a plurality of horizontally disposed rollers that lie between the rollers on said spindles, said horizontally disposed rollers being so shaped that they will form a tapered recess at the bottom of the hole and one of the rollers on said spindles being of greater diameter than the other roller.

10. A boring drill comprising a head, a substantially cone-shaped bearing member arranged on said head, a roller provided on its under side with a pocket for receiving said member, and a fastening device passing through said roller and member and screwed into the head and provided at its outer end with a portion that laps over the end face of said roller.

11. A boring drill comprising a head, a substantially cone-shaped bearing member arranged on said head, a roller provided on its under side with a pocket for receiving said member, and a fastening device passing through said roller and member and screwed into the head and provided at its outer end with a portion that laps over the end face of said roller, the roller being provided in its end face with a recess for receiving the overlapping portion of said fastening device.

12. A rotary boring drill comprising in combination, a head, a cross roller shaft on the forward end thereof, cutters on said shaft, the cutting surfaces of which are inclined forwardly toward the central axis of the head and inclined cutters on each side of said shaft.

13. A rotary boring drill comprising in combination, two side bearings at the forward end thereof, a cross roller shaft in said bearings, frusto-conical rolling cutters on said shaft, the largest diameter of said cutters being at the central axis of the head and inclined side cutters arranged to cut clearance for said side bearings.

14. A rotary boring drill comprising a head, a V-shaped recess in the forward end thereof, bearing supports at each end of said recess, a cross roller shaft in said bearings, rolling cutters thereon adapted to drill a dish-shaped hole to center said drill, and cutters mounted on the side faces of said recess.

15. A rotary boring drill comprising in combination, a head, a V-shaped recess in the forward end thereof, a cross roller mounted longitudinally of said recess, and a disk-shaped cutter on each side face of said recess, the pins for said disk cutters being inserted from the inside of said head and retained in the walls of said recess.

16. A rotary boring drill comprising in combination, a head, a V-shaped recess in the forward end thereof, a cutting roller longitudinally of said recess, and disk-shaped side cutters mounted parallel with the side faces of said recess, the bearing pins therefor being threaded outwardly from said recess into the side of the head.

In testimony whereof I hereunto affix my signature in the presence of two witnesses, this first day of April, 1913.

HOWARD R. HUGHES.

Witnesses:
WELLS L. CHURCH,
GEORGE BAKEWELL.